Patented Apr. 15, 1924.

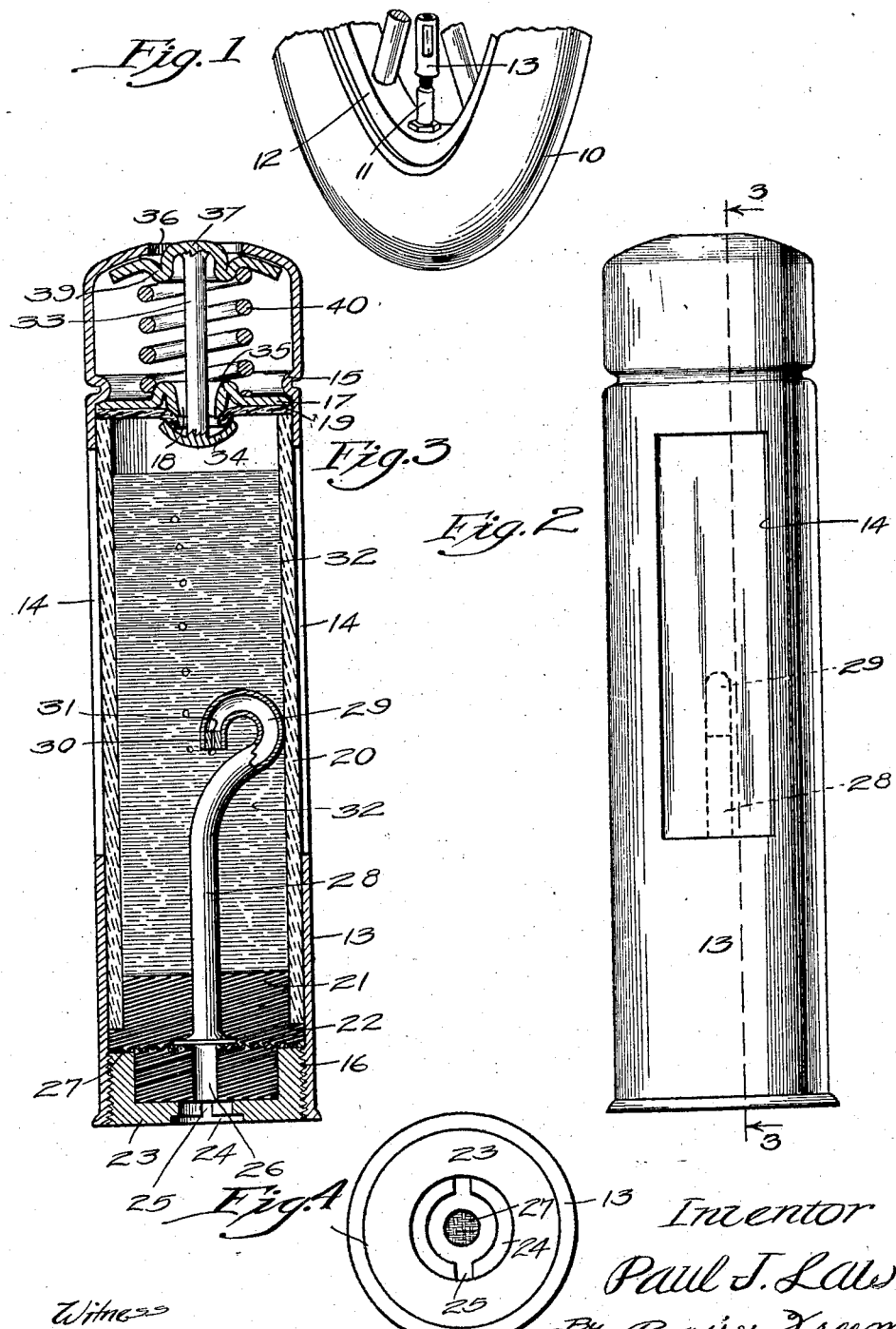

1,490,670

UNITED STATES PATENT OFFICE.

PAUL J. LAW, OF PERRY, IOWA.

VALVE-CORE TESTER.

Application filed May 8, 1922. Serial No. 559,313.

*To all whom it may concern:*

Be it known that I, PAUL J. LAW, a citizen of the United States, residing at Perry, in the county of Dallas and State of Iowa, have invented a certain new and useful Valve-Core Tester, of which the following is a specification.

The object of my invention is to provide a valve core tester, especially adapted for testing the efficiency of a valve core used in connection with pneumatic tires.

More particularly, my invention relates to a mechanism adapted to be placed over a valve stem of a pneumatic tire so that if there is any undesired escaping of air from within the tire, it will be easy to detect the same.

Still another object is to provide such a device having a transparent portion therein, through which may be detected the escape of a very small amount of air through the valve core.

Still another object is to use in such a device a viscous liquid wherein air will cause bubbles to form therein, and yet the liquid is of such consistency that it will not pass into a small opening through which any escaping air must pass in order to get into the liquid.

Still another object is to provide a manually operable valve structure for permitting any air within the device to be discharged therefrom.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 is a perspective view of a portion of a pneumatic tire with my improved tester shown thereon.

Figure 2 is a side elevation of my device greatly enlarged.

Figure 3 is a central, sectional view taken on the line 3—3 of Figure 2; and

Figure 4 is an end view of the bottom of the tester.

In the accompanying drawings, I have used the reference numeral 10 to indicate generally, a pneumatic tire which is provided with an inner tube having a valve stem 11 thereon. The valve stem extends through the felly 12 of a wheel. The parts just described are of the ordinary construction.

In this connection it may be mentioned that in a great many instances, the valve cores of the valve stems are inefficient, permitting a very small amount of air to continually escape therethrough. The escaping air is of such small quantities that it is impossible to easily discover the same.

My device consists of a shell or casing 13 which is provided with a pair of openings 14 in its opposite sides. The casing 13 is arranged with an inwardly extending bead 15 near its upper end. The purpose of the bead 15 will be hereinafter more fully set forth.

The lower end of the shell 13 is provided on its inner surface with screw threads 16. Received within the shell 13 and resting against the bead 15, is the plate 17 having a central opening 18.

Resting against the under side of the plate 17 is a rubber disk or washer 19 provided with an opening adapted to register with the opening 18 in the plate 17. A glass tube 20 is received within the shell 13 and has one of its ends resting firmly against the washer 19.

From the construction of the parts just described, it will be seen that the plate 17 and the washer 19 form a closure structure for one end of the glass tube 20.

In order to close the opposite end of the glass tube 20, I provide a rubber cylinder member 21 which is provided with a contracted portion designed to be received within the tube 20 and with a flange 22 of substantially the same size as the interior of the shell 13. The flange 22 rests against one end of the tube 20.

In order to hold the rubber cylinder member 21 in position, I provide the collar 23 having a central opening 24 therein and having its outer surface provided with screw threads adapted to coact with the screw threads 16 in the shell 13.

The collar 23 is provided with a pair of notches 25 formed near the opening 24 so that a screw driver or some other tool may be inserted for rotating the collar 23. From the construction of the parts just described it will be seen that the cylinder member 21 forms a closure for one end of the glass tube.

The collar 23 is used for holding the cylinder member 21 in position and for forcing the glass tube 20 sufficiently against the washer 19 so that the tube 20 forms a substantially air-tight compartment.

The rubber cylinder 21 is provided with a short pipe 26 which coincides with the opening 24 in the collar 23. A fine mesh screen 27 is formed in the cylinder 21 and extends across one end of the pipe 26.

A pipe 28 having its lower end bell shaped so that it will be securely held within the rubber cylinder 21 registers with the pipe 26 and extends upwardly within the glass cylinder 20. The upper end of the pipe 28 is provided with a goose neck 29.

The free end of the goose neck 29 of the pipe 28 is provided with a plug 30 having a very small opening 31 therein. The fine mesh screen 27 is designed to prevent any dirt from passing in through the pipe 26 and into the pipe 28.

The glass tube 20 is filled with viscous liquid 32. The opening 31 is so small that the liquid will not pass through it into the pipe 28.

The goose neck 29 is so arranged that it may be seen through the openings 14 in the shell 13, as clearly illustrated by the dotted lines in Figure 2 of the drawings.

In order to form a closure for the opening 18 in the plate 17, I provide the following described valve structure. A rod 33 is extended through the opening 18 and the opening in the washer 19, and is provided with a cup shaped member 34 on its lower end.

The material of the plate 17 adjacent to the opening 18 is so arranged that a bead 35 is formed. The bead 35 also causes the rubber washer 19 to be slightly bent downward adjacent to the opening therein, as clearly shown in the drawings.

The cup shaped member 34 is designed to engage the washer 19 and seal the opening therein. The upper end of the shell 13 is provided with an opening 34. The upper end of the rod 33 is provided with a disk 37 having a bead 39 formed therein.

The upper portion of the disk 37 is substantially flush with the upper edge of the shell 13 and extends into the opening 36. A coil spring 40 extends around the rod 33 and has one of its ends extended around the bead on the plate 17 while its opposite end extends around the bead 39 on the disk 37.

From the construction of the parts just described it will be seen that the screen 40 normally tends to cause the cup shaped member to securely engage the washer 19.

I will now describe the practical operation of my device. The opening 24 is placed so that it receives the upper end of the valve stem 11. Any escaping air will pass through the pipes 26 and 28 and will be discharged through the small opening 31 into the liquid 32. The discharging of air into the liquid will cause bubbles to be formed therein, which will be readily noticeable by the operator, through the openings 14 in the shell 13.

In order to release any air from within the compartment, formed by the glass tube 20, the valve structure in the upper end is opened by forcing the disk downwardly for moving the cup shaped member 34 away from the washer 19.

It will be seen that this device will operate when only a very small amount of air is escaping through the valve core in the valve stem. There is a sufficient amount of liquid within the device so that the valve core may be tested at any angle which it may happen to be in.

It will be seen that my device may readily be assembled and is of a very convenient form.

Some changes may be made in the construction, and arrangement of the various parts of my invention, without departing from the real spirit and purpose of my invention and it is my intention to cover by my claims, any modified forms of structure or use of mechanical equivalents which may be reasonably included within their scope.

I claim as my invention:

1. A valve core tester for pneumatic tires or the like including a casing, liquid of a viscous nature in said casing, a pipe arranged to have one end fit over the end of a valve stem, its other end terminating in the liquid in such a manner that escaping air from the tire will be forced to pass through the liquid, and an inwardly opening valve, manually operable to release the air within the tester, said valve being held in closed position by spring pressure.

2. In a device of the class described including a shell having a pair of registering openings therein, a tubular member of transparent material received in said shell, liquid of a viscous state in said tubular member, a pipe arranged to have one end coact with a valve stem and its other end terminating within the liquid, the end of the pipe in said liquid having an opening therein of such size that the liquid will not pass therein but air will, so that any escaping air from the pneumatic tire will pass into the liquid and be visible.

3. A valve core tester for pneumatic tires or the like including a casing, liquid of a viscous nature in said casing, a pipe arranged to have one end fit over the end of a valve stem, its other end terminating in the liquid in such a manner that escaping air from the tire will be forced to pass through the liquid, the end of the pipe in said liquid having an opening therein of such size that the liquid will not pass therein but air will be allowed to escape therethrough so that any escaping air from the pneumatic tire will pass into the liquid and be visible.

4. A valve core tester for pneumatic tires or the like including a casing, liquid of a viscous nature in said casing, a pipe arranged to have one end fit over the end of a valve stem, its other end terminating in the liquid in such a manner that escaping air from the tire will be forced to pass through the liquid, the end of the pipe in said liquid having an opening therein of such size that the liquid will not pass therein but air will be allowed to escape therethrough so that any escaping air from the pneumatic tire will pass into the liquid and be visible, and a screen mounted so as to close the tube in order that air passing therethrough may be forced to pass through the screen.

5. In a valve tester, a casing having an opening therein, one end of the casing being open, the other end being partly closed, an inwardly projecting bead in the side of the casing spaced from the partly closed end thereof, a disk disposed against said bead, a transparent tube in the casing, a collar for holding said tube against the washer, a plug for securing said collar in place, a pipe embedded in the collar and extending into the transparent tube, a viscous liquid partly filling the tube and extending above the end of the pipe, a valve adapted to seat against the inner side of the disk, a valve stem extending through the opening therein, a disk on the end of said stem adjacent the opening in the partly closed end of the casing, and a spring surrounding the valve stem between the disk and the end of the casing and adapted to maintain the valve closed, the collar having a passage communicating with the pipe and adapted to fit over the end of a valve stem.

Des Moines, Iowa, April 28, 1922.

PAUL J. LAW.